(12) United States Patent
Haga et al.

(10) Patent No.: US 7,663,287 B2
(45) Date of Patent: Feb. 16, 2010

(54) MOTOR

(75) Inventors: Hidehiro Haga, Kyoto (JP); Yoshiaki Yamashita, Kyoto (JP); Nakaba Kataoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 267 days.

(21) Appl. No.: 11/758,264

(22) Filed: Jun. 5, 2007

(65) Prior Publication Data
US 2007/0278876 A1 Dec. 6, 2007

(30) Foreign Application Priority Data
Jun. 5, 2006 (JP) .............................. 2006-156717

(51) Int. Cl.
*H02K 11/00* (2006.01)
(52) U.S. Cl. ........................................ 310/260; 310/71
(58) Field of Classification Search ................... 310/71, 310/180, 194, 216, 260, 218; 439/76.2, 174, 439/189, 213, 675, 874, 890
See application file for complete search history.

(56) References Cited

U.S. PATENT DOCUMENTS

| | | | | |
|---|---|---|---|---|
| 5,900,687 A | * | 5/1999 | Kondo et al. ................... | 310/71 |
| 6,674,195 B2 | * | 1/2004 | Yagyu et al. ................... | 310/71 |
| 6,856,055 B2 | * | 2/2005 | Michaels et al. .............. | 310/71 |
| 6,856,057 B2 | * | 2/2005 | Kobayashi et al. ............ | 310/71 |
| 6,993,829 B2 | * | 2/2006 | Kobayashi et al. ............ | 29/622 |
| 7,019,433 B2 | * | 3/2006 | Hashimoto et al. .......... | 310/259 |
| 7,026,739 B2 | | 4/2006 | Okada et al. | |
| 7,122,933 B2 | * | 10/2006 | Horst et al. .................. | 310/218 |
| 7,166,949 B2 | | 1/2007 | Okada et al. | |
| 7,382,075 B2 | * | 6/2008 | Wang et al. .................. | 310/194 |
| 2004/0119350 A1 | * | 6/2004 | Miya et al. .................... | 310/71 |
| 2004/0263015 A1 | | 12/2004 | Okada et al. | |
| 2005/0253466 A1 | * | 11/2005 | Seguchi et al. ................ | 310/71 |
| 2006/0119207 A1 | | 6/2006 | Okada et al. | |

FOREIGN PATENT DOCUMENTS

JP       3498129 B2      2/2004
JP       2005-020875 A   1/2005

OTHER PUBLICATIONS

Hidehiro Haga et al.; "Motor," U.S. Appl. No. 11/758,260, filed Jun. 5, 2007.

* cited by examiner

*Primary Examiner*—Tran N Nguyen
(74) *Attorney, Agent, or Firm*—Keating & Bennett, LLP

(57) ABSTRACT

A motor includes a stator and a bus bar supported axially above the stator. The bus bar includes a concave portion arranged in a lower surface thereof facing toward coils of the stator. In a gap defined between the coil and the concave portion, a portion of the wire extracted from the coil and wound in the circumferential direction (i.e., a crossover wire portion) is accommodated. The bus bar includes a wire-positioning hole through which the wire is led to a terminal to be connected with the wire.

18 Claims, 14 Drawing Sheets

MOTOR

BACKGROUND OF THE INVENTION

1. Field of the Invention

The present invention generally relates to a motor, in particular to a brushless motor having a bus bar connected to a stator.

2. Description of the Related Art

Conventionally, a brushless motor (hereinafter simply referred to as a motor) used for an electric powered power-steering system includes a bus bar having a connector to which a coil arranged on a stator is connected. The stator is formed by axially laminating a plurality of steel plates. The stator includes a core back having a circular shape centered on a center axis and teeth extending radially inwardly from an inner circular surface of the core back. The teeth are arranged in a circumferentially spaced manner from each other. A set of insulators, each of which has a U-shape, are attached to each of the teeth. One of the insulators is attached to each of the teeth from an axially upper side thereof, and the other is attached to the teeth from an axially lower side thereof. Then, a wire is wound around the insulators of each of the teeth such that a coil defined by a multilayer structure of the wire is provided on each of the teeth.

Recently, there has been a demand for reducing vibration of the motor used for the power steering system in order to realize smooth steering. One way to meet the demand is increasing the number of teeth of the stator.

In addition, a number of turns of the wires wound around the teeth may be increased to reduce a space between adjacent teeth (i.e., increase a packing factor of the coils). In order to increase the packing factor and number of teeth, a technique described below has been introduced. Conventionally, a plurality of stator cores, each of which generally has a tooth, respectively, are separately formed, and a coil is formed on each of the teeth. Then, the stator cores are circumferentially attached to each other to provide a stator. Such technique is simply referred to as a divided-core-manufacturing method. In another example, the coils are formed on each of the teeth extending from the core back which has a substantially linear shape, then, the core back is bent at predetermined positions so as to form the circular shape. Such technique is simply referred to as a curving-core-manufacturing method.

In the above-mentioned technique, the wire may be wound around each of the teeth separately, and thus, each of the teeth may include two wire-ends, a winding-starting end and a winding-terminating end. Thus, the bus bar includes twice as many terminals as the number of the teeth.

As the number of the terminals arranged on the bus bar increases, a space between adjacent terminals is reduced. With a reduced space between adjacent terminals, it becomes difficult to connect the wires to the terminals. In particular, the wire used in the motor for the power steering system generally has a thick dimension. Thus, in view of workability of connecting wires, it is preferable that the space between adjacent terminals is sufficiently wide.

It is demanded that a component of a vehicle has high reliability under various circumstances for extended periods of time. Thus, it is required that the motor used for the power steering system have that property.

SUMMARY OF THE INVENTION

In order to overcome the problems described above, preferred embodiments of the present invention provide a motor including a stator and a bus bar.

The stator preferably includes a stator core having a core back that preferably has a circular or substantially circular shape centered on a center axis and a plurality of tooth portions extending radially inwardly from the core back and arranged in a circumferentially spaced manner, an insulator covering at least a portion of the stator core to insulate at least the portion of the stator core, and a coil defined by a multilayer structure of a wire wound around each of the tooth portions via the insulator.

The bus bar is arranged axially above the stator and includes a conductor plate having a plurality of terminals to which an end portion of the wire is to be connected, and a plate support supporting the conductor plate and having an axially lower surface. A portion of the plate support faces the coil via a space defined therebetween, and a portion of the wire which is a crossover wire portion at which the wire extracted from the coil extends in the circumferential direction in the space. An axial height of the space defined between the portion of the lower surface of the plate support and the coil is greater than a diameter of the wire.

With this unique configuration, a motor whose axial height is reduced may be provided. In addition, it is possible to prevent the wire from falling into the radial interior of the coil, thereby making it possible to provide a reliable motor.

The preferred embodiments of the present invention also provide a motor provide a motor including a stator and a bus bar.

The stator is defined by a stator core including a core back preferably having a circular or substantially circular shape centered on a center axis and a plurality of tooth portions radially inwardly extending from the core back and arranged in a circumferentially spaced manner, an insulator covering at least a portion of the stator core to insulate at least the portion of the stator core, and a coil defined by a multilayer structure of a wire wound around each of the tooth portions via the insulator.

The bus bar is arranged axially above the stator and includes a conductor plate having a plurality of terminals to which an end portion of the wire is to be connected, a plate support supporting the conductor plate and having a axially lower surface a part of which faces the coil via a space defined therebetween, a plurality of leg portions arranged circumferentially spaced manner and positioning the plate support axially above the stator, and a wire positioning portion arranged at radially outside portion of the plate support. In addition, one end of the wire is inserted into the wire positioning portion to set a position from which the wire is led axially upward of the plate support.

With this unique configuration, even in a case that the bus bar is used in the motor to connect the wires from the coils of the motor, the wires are easily guided to the terminals of the bus bar.

Preferred embodiments of the present invention also provide a motor including a stator and a bus bar.

The stator is defined by a stator core including a core back preferably having a circular or substantially circular shape centered on a center axis and a plurality of tooth portions radially inwardly extending from the core back and arranged in a circumferentially spaced manner, an insulator covering at least a portion of the stator core to insulate at least the portion of the stator core, and a coil defined by a multilayer structure of a wire wound around each of the tooth portions via the insulator.

The bus bar is arranged axially above the stator and includes a conductor plate having a plurality of terminals to which an end portion of the wire is to be connected and a body portion connecting a plurality of the terminals, and a plate support having in an axially upper surface an insertion groove which supports the conductor plate therein and a axially lower surface, a portion of which faces the coil via a space defined therebetween.

An axial depth of the insertion groove is greater than an axial height of the body portion of the conductor plate, and the insertion groove has a portion where a width thereof in the radial direction is narrower than a thickness of the body portion in the radial direction.

With this unique configuration, it is possible to prevent the conductor plate from coming out of the insertion groove, thereby making it possible to provide a reliable motor.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
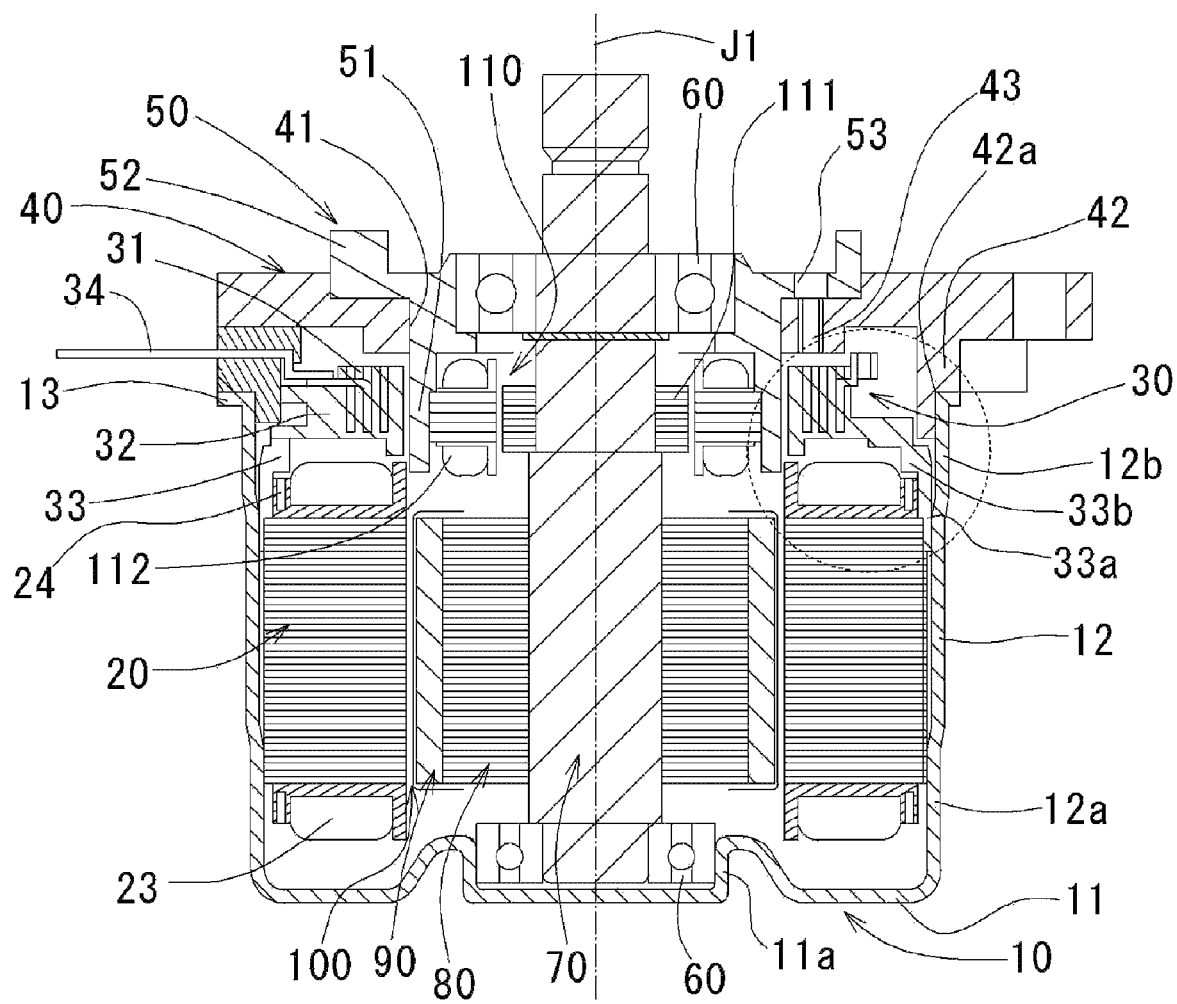
FIG. 1 is a view illustrating a cross section of a brushless motor along a center axis thereof, according to a preferred embodiment of the present invention.

In the following description, when positional relationships among and orientations of the different components are described as being such as top/bottom, up/down or left/right, positional relationships and orientations that are in the drawings are indicated, and positional relationships among and orientations of the components once having been assembled into an actual device are not indicated. Meanwhile, in the following description, an axial direction indicates a direction parallel to a rotation axis, and a radial direction indicates a direction perpendicular to the rotation axis.

General Structure of Motor

With reference to FIG. 1, a structure of a motor according to a preferred embodiment of the present invention will be described. FIG. 1 is a view illustrating a cross section of the motor along a center axis J1.

As illustrated in FIG. 1, a housing 10 of the motor includes a cylindrical portion 12 centered on the center axis J1 and a base 11 closing a lower side of the cylindrical portion 12. The cylindrical portion 12 and the base 11 are, for example, made integral with each other by pressing a metallic plate material. The base 11 includes an annular recess 11a at a substantially center portion thereof. The cylindrical portion 12 includes a lower section 12a, an upper section 12b, and a middle section arranged axially between the lower section 12a and the upper section 12b. The lower section 12a has a smaller diameter than that of the middle section, and the upper section 12b has a greater diameter than the middle section. A stator 20 having a circular outside surface is inserted into the housing 10 and an axially lower portion of the stator 20 is press-fitted into the lower section 12a. The housing 10 also includes a flange portion 13 radially outwardly extending from an axially upper end portion of the cylindrical portion 12.

A bus bar 30, which is electrically connected to the stator 20 by connecting wires from the stator 20 thereto, is mounted axially above the stator 20. The bus bar 30 includes a plurality of first conductor plates 31 which is electrically connected with the stator 20, a plate supporting portion 32 which supports the first conductor plates 31, and a plurality of leg portions 33 supporting the bus bar 30 axially above the stator 20. Each of the leg portions 33 has an outer circumferential surface abutted against an inner circumferential surface of the cylindrical portion 12 such that the leg portion 33 is secured to the housing 10.

A bracket 40 which supports various components of the motor (not illustrated in drawings) is arranged axially above the housing 10 and the bus bar 30. In particular, an upper surface of the flange portion 13 and a portion of an inner surface of the upper section 12b of the cylindrical portion 12 are abutted against the bracket 40 and support the bracket 40 thereon. The bracket 40 includes a substantially discoid portion having an insertion hole 41 centered on the center axis J1. The bracket 40 includes a cylindrical portion 42 axially downwardly extending from the discoid portion and having a diameter that is approximately the same as that of the cylindrical portion 12. An axially lower end of the cylindrical portion 42 includes a step section 42a at which an outer circumferential surface of the cylindrical portion 42 is radially inwardly indented. The step portion 42a is abutted against the upper surface of the flange portion 13 and the inner circumferential surface of the upper section 12b, such that the bracket 40 is supported above the housing 10.

A bearing holder 50 is inserted into the insertion hole 41 and supported by the bracket 40. The bearing holder 50 has a substantially cylindrical shape and includes an inner cylindrical portion 51 and an outer cylindrical portion 52. An outer circumferential surface of the inner cylindrical portion 51 slidably contacts an inner circumferential surface of the bracket 40 defining the insertion hole 41. The outer cylindrical portion 52 contacts an upper surface of the bracket 40. The inner cylindrical portion 51 axially downwardly extends such that an axially lower portion thereof radially faces the bus bar 30.

Ball bearings 60 are arranged on an inner circumferential surface 51 of the bearing holder 50 and in the annular recess 11a, respectively. A shaft 70 is supported by the ball bearings 60 in a rotatable manner with centering on the center axis J1.

A yoke 80 defined by laminating a plurality of magnetic thin plates is attached to a position on the shaft 70 radially inward of the stator 20. A rotor magnet 90 is attached on an outer circumferential surface of the yoke 80 by an adhesive. A cover member 100 made of non-magnetic material is attached at outside of the rotor magnet 90 so as to prevent the rotor magnet 90 from being removed.

A resolver 110, a position detecting mechanism, provided to the motor, is defined by a resolver rotor 111 and a resolver stator 112. In general, a resolver is a type of rotary electrical transformer that is used for measuring the angle of a rotating machine. The resolver is generally defined by a resolver rotor and resolver stator. The resolver rotor generally includes a primary winding of the transformer, and is excited by a sinusoidal electric current, which by electromagnetic induction causes currents to flow in resolver coils fixed at right angles relative to each other on the resolver stator. A resolver rotor 111 is attached at a position on the shaft 70 radially inside of the bus bar 30, and the resolver stator 112 is attached on the inner circumferential surface of the inner cylindrical portion 51, wherein the resolver rotor 111 and the resolver stator 112 radially face to each other.

The bracket 40 includes a plurality of bracket-through holes 43, and the bearing holder 50 includes a plurality of bearing-holder-through holes 53. The bearing holder 50 is arranged on the bracket 40 such that the through holes 43, 53 are axially aligned to each other. Fastening elements such as screws (not illustrated in drawings) are inserted and fastened to the through holes 43, 53 and the bracket 40 and the bearing holder 50 are fixed to each other. Each of the bracket-holder-through holes 53 has an arc shape centered on the center axis J1, having a radial width substantially the same or greater than the diameter of the fastening means fastened to the through holes 43, 53. With this configuration, the bearing holder 50 is secured to the bracket 40 in a circumferentially movable manner to a certain degree, enabling adjustment of a circumferential position of the resolver stator 112.

Structure of Stator

Figure 2:
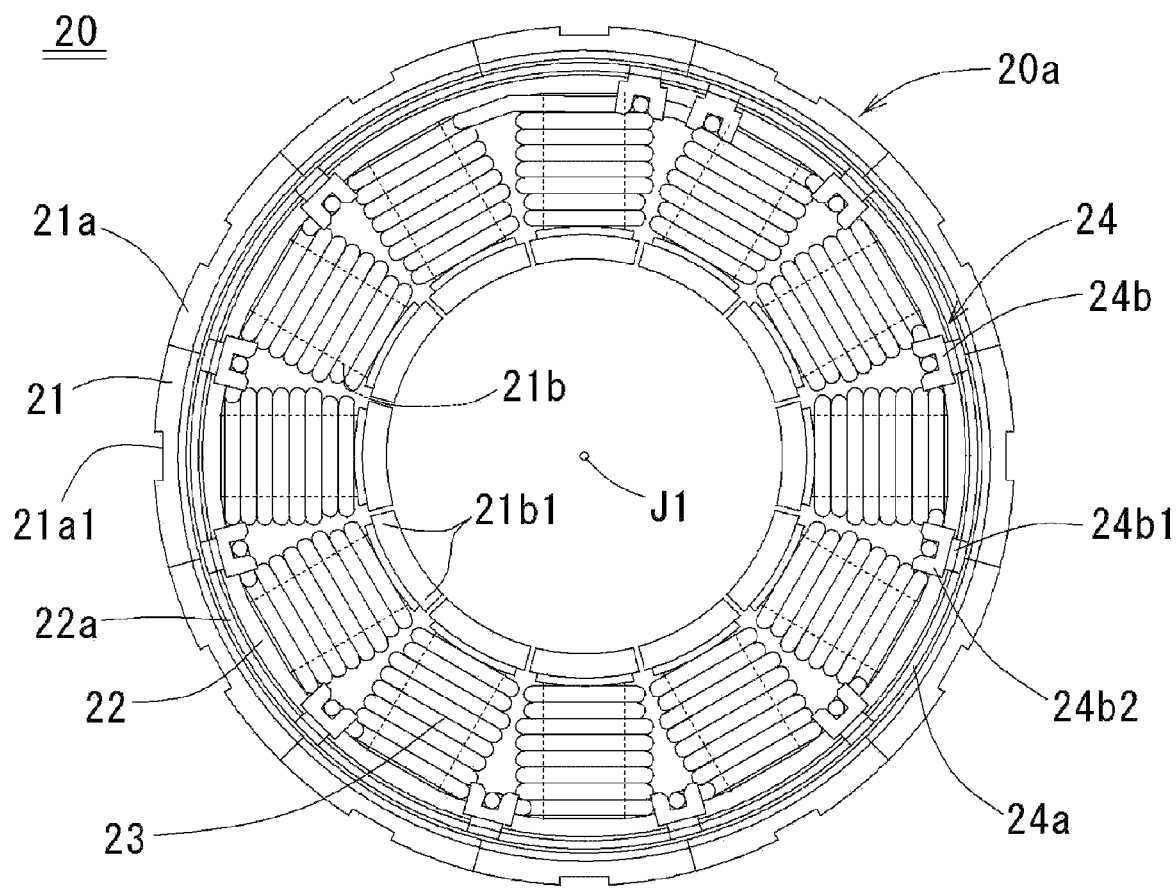
FIG. 2 is a plan view illustrating a stator according to a preferred embodiment of the present invention.
Figure 3:
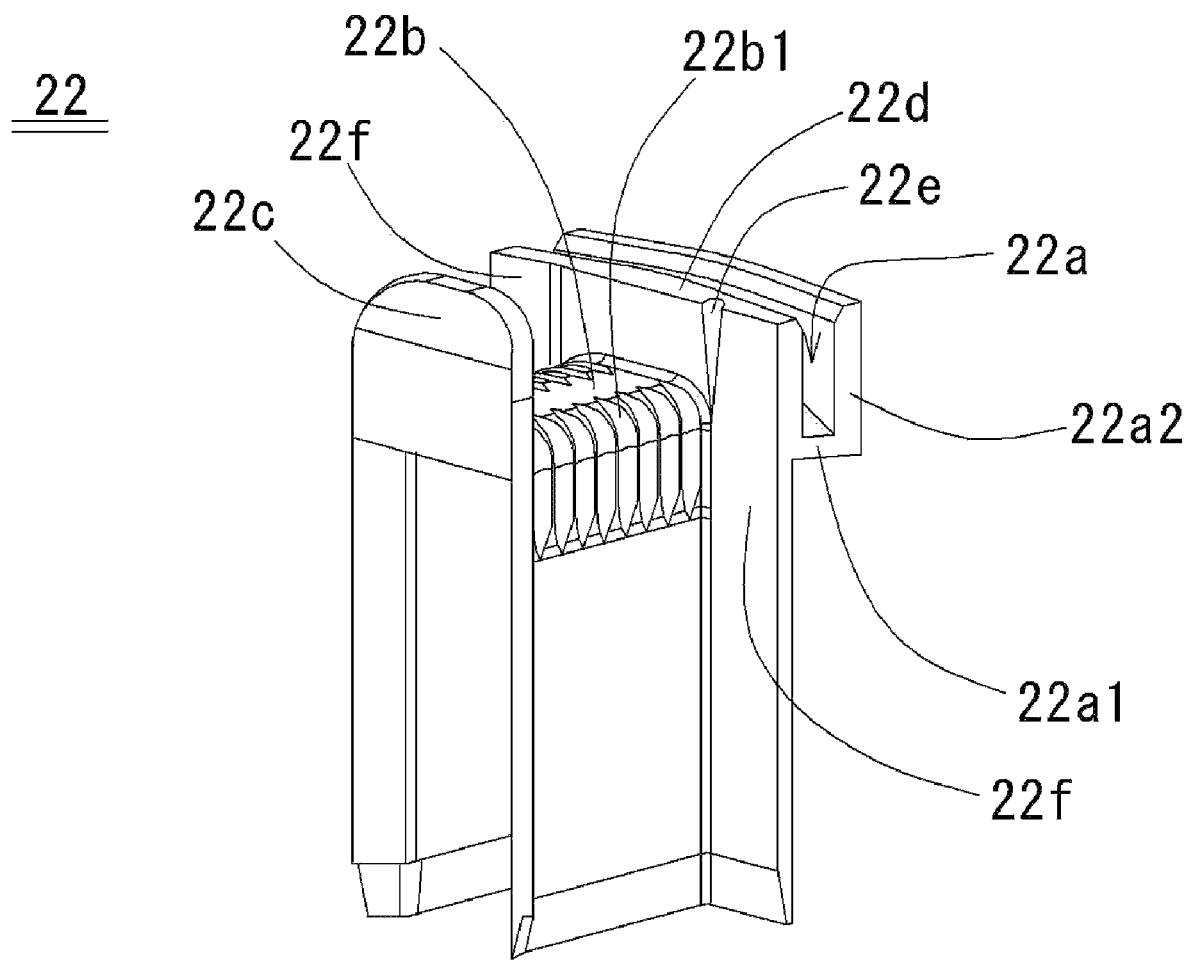
FIG. 3 is a perspective view illustrating an insulator according to a preferred embodiment of the present invention.
Figure 4:
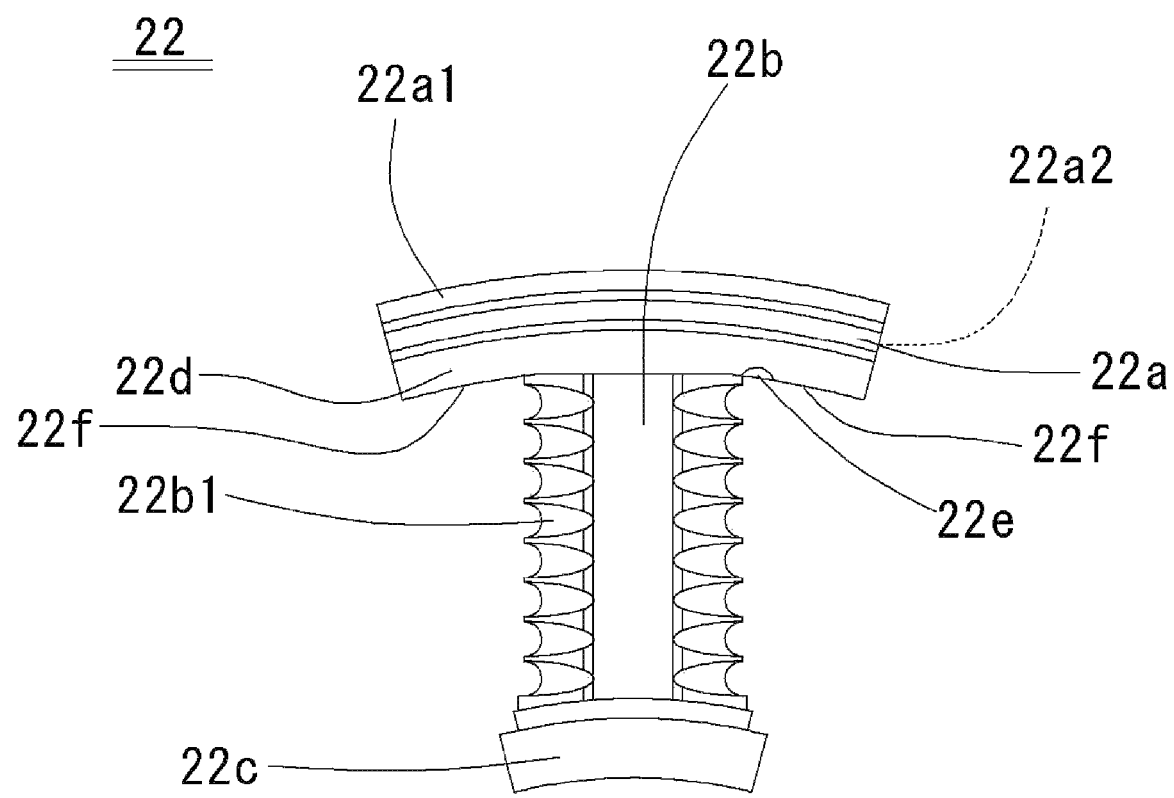
FIG. 4 is a top view illustrating the insulator.
Figure 5:
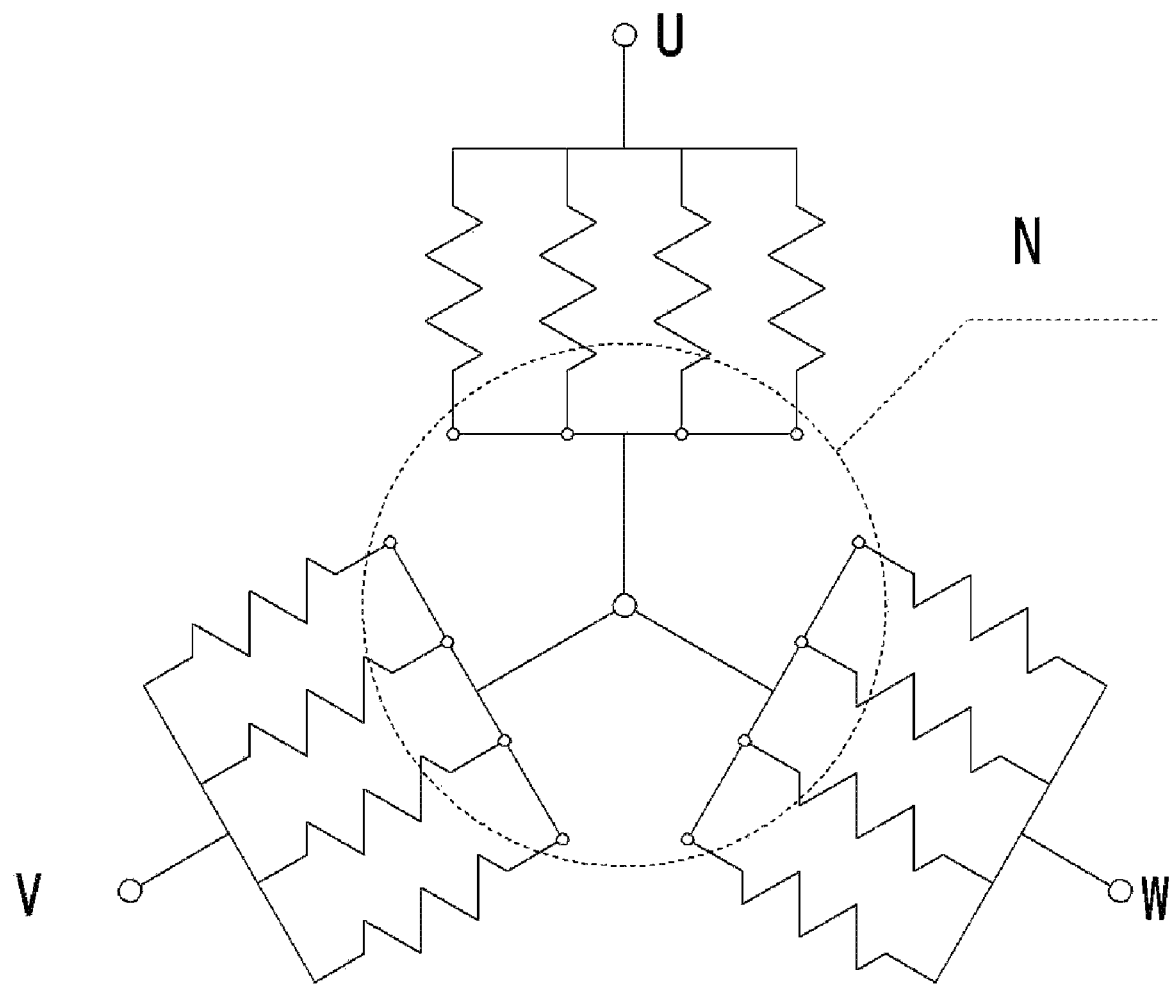
FIG. 5 is a schematic view illustrating electric connections between the stator and the bus bar.

With reference to FIGS. 2 to 5, structures of the stator 20 and the bus bar 30 will be described. FIG. 2 is a top view illustrating the stator 20. FIG. 3 is a perspective view illustrating an insulator 22. FIG. 4 is a top view illustrating the insulator 22. FIG. 5 is a schematic view illustrating electric connections of the coils 23.

As illustrated in FIG. 2, the stator 20 is formed by combining a plurality of divided cores 20a (for example, twelve divided cores 20a are preferably used in the present preferred embodiment of the present invention). Each of the divided cores 20a includes a stator core 21 defined by a core back portion 21a having an arc shape and a tooth portion 21b extending radially inwardly toward the center axis J1, a set of insulators 22 covering a portion of the stator core 21 (i.e., the tooth portion 21b) from an axially upper side and an axially lower side of the stator core 21, and a coil 23 defined by a multilayer structure of a wire wound around each of the tooth portion 21b via the insulators 22. The insulators 22 are arranged on the stator core 21 to insulate the wire of the coil 23 and the stator core 21.

The stator core 21 is preferably formed by laminating a plurality of thin magnetic steel plates. The stator core 21 further includes a circumferentially extending portion 21b1 extending circumferentially from a radially inner tip of the tooth portion 21b1. The outer circumference surface of the core back portion 21a includes an outer concave portion 21a1 at which a portion of the outer circumferential surface is radially inwardly indented.

As stated above, the insulators 22 attached to the stator core 21 cover a tooth portion 21b and a portion of the radially inner side of the core back portion 21a. More specifically, each of the insulators 22 has a substantially U-shape, and insulators 22 axially cover the tooth portion 21b1 but not an inner circumferential surface of the tooth portion 21b. As illustrated in FIG. 3, at least one of the insulators 22 arranged on an axially upper side of the stator core 21 includes a guiding groove 22a at a radially outside portion thereof, and a second conductor plate 24 preferably having a circular or substantially circular shape is inserted in the guiding groove 22a. The second conductor plate 24 includes a plurality of second terminals 24b (for example, twelve second terminals in the present preferred embodiment of the present invention) arranged thereon.

With reference to FIGS. 3 and 4, a structure of the insulator 22 will be described. As stated above, a set of insulators 22 are arranged on the tooth portion 21b, and one insulator 22 is attached to the tooth portion 21b from the axially upper side thereof, and the other insulator 22 is attached from the axially lower side thereof.

As illustrated in FIGS. 3 and 4, the insulator 22 includes an upper surface 22b covering an upper end of the tooth portion 21b and a side surface covering a side of the tooth portion 21b. The insulator 22 includes a plurality of wire-guiding grooves 22b1 preferably disposed parallel or substantially parallel to each other, each of which extends at least along a portion of the upper surface 22b and the side surface, and has a width that is substantially the same as a diameter of the wire. With the wire-guiding grooves 22b1, the wire is wound around the insulator 22 in a predetermined position. It should be noted, however, the wire-guiding grooves 22b1 may be extended across the upper surface 22b1 entirely.

The insulator 22 includes an inner wall 22c and an outer wall 22d to prevent the wire wound around the tooth portion 21b via the insulator 22 from falling radially inward and/or radially outward of the tooth portion 21b.

The outer wall 22d includes an outer extending portion 22f, which circumferentially extends from the radially outside end of the side surface. The outer extending portion 22f includes a wire-inlet guide 22e, which is defined by a groove axially extending along the radially outside end of the side surface in a radially inner side of the outer extending portion 22f. When the wire is wound around the insulator 22, the wire is positioned in the wire-inlet guide 22e and then winding of the wire is performed. A depth and a width of the groove defining the wire-inlet guide 22e gradually increase along the axial upper direction. In other words, the wire-inlet guide 22e extends in the axial direction while inclining in the radially outside direction.

In general, when the wire is wound around the tooth portion 21b to form the coil 23 (not illustrated in drawings) thereon, the wire is bent and hocked at an axial upper end of the outer wall 22d (i.e., at an upper end portion of the wire-inlet guide 22e), and the wire is pulled axially downwardly and wound around the tooth portion 21b with maintaining a substantially constant tension applied thereto. With the wire-inlet guide 22e, the wire is easily positioned at the beginning of winding wire process, facilitating the guiding of the wire to the wire-guiding groove 22b1 (i.e., facilitating the wire-winding process). In the present preferred embodiment of the present invention, since the wire-inlet guide 22e axially extends while inclining in the radially outside direction, the force applied to a portion of the wire at which the wire is bent may be reduced at the beginning of the wire-winding process. Thus, it is possible to prevent the wires from being damaged by contacting the outer wall 22d of the insulator 22.

The insulator 22 includes the guiding groove 22a. The guiding groove 22a is defined by an radially outer surface of the outer extending portion 22f, an outer extension 22a1 radially outwardly extending from the radially outer surface of the outer extending portion 22f, and a groove wall 22a2 axially upwardly extending from an radially outside end of the outer extension 22a1. As illustrated in FIG. 3, the outer extending portion 22f extends into the axial direction and covers a radially inside surface of the core back portion 21a.

The outer wall 22d has an arc shape in its axially top view (see FIG. 4), and a length in a circumferential direction is determined by an arc angle thereof. The approximate arc angle of the outer wall 22d is obtained by dividing 360 degrees by the number of tooth portions 21b to be arranged in the stator 20. In the present preferred embodiment of the present invention, twelve tooth portions 21b are arranged in the stator 20, thus, the arc angle of the outer wall 22d is approximately 30 degrees. Meanwhile, lengths of the outer wall 22d, the outer extension 22a1, and the groove wall 22a2, in the circumferential direction centered on the center axis J1 are preferably slightly smaller than the circumferential length determined by the arc angle. With this configuration, the insulators 22 of the divided cores 20a arranged adjacent in the circumferential direction do not contact with each other when the stator 20 is assembled by arranging the divided cores 20a in the circular configuration, thereby maintaining a preferable roundness of the inner surface of the stator 20.

With reference to FIG. 2, a configuration of the second conductor plate 24 arranged in the guiding groove 22a will be described.

The second conductor plate 24 includes a body portion 24a having a cylindrical shape and a plurality of second terminals 24b radially inwardly protruding from the body portion 24a. A first end portion of the wire wound around the tooth portion 21b is electrically connected to the second terminals 24b, respectively. Hereinafter, the first end of the wire is referred to as a winding-starting end firstly held with the wire-inlet guide 22e and connected to the corresponding terminal 24b when the wire is wound around the tooth portion 21b.

The body portion 24a is preferably formed by pressing a conductive metallic plate into a predetermined shape and rounding a pressed conductive metallic plate into a cylindrical or substantially cylindrical shape. Then, the second terminals 24b are formed by bending portions of the body portion 24a in the radially inward direction.

Each of the second terminals 24b includes a bent portion 24b1 radially inwardly extending from the body portion 24a and a connecting portion 24b2 axially upwardly extending from a radially inner end of the bent portion 24b1. The bent portion 24b1 and the connecting portion 24b2 are preferably integral, and the winding-starting end of the wire is electrically connected to the connecting portion 24b2 by welding, for example.

The second terminals 24b of the second conductor plate 24 are preferably circumferentially equally spaced manner but for a location near an output terminal 31b (see FIG. 6 and FIG. 11) used for connecting the bus bar 30 and the second conductor plate 24. Near the output terminal 31b, the second terminal 24ba is arranged adjacent to the output terminal 31b in the circumferential direction. In relation to the bus bar 30, the terminals 24b are arranged between adjacent leg portions 33 in the circumferential direction respectively. Meanwhile, the first conductor plate 31 of the bus bar 30 includes first terminals 31a (see FIG. 8) to be arranged axially above the leg portions 33 (i.e., the leg portions 33 and the first terminals 31a are arranged in an axially overlapping manner). With this configuration, the second terminals 24b are arranged circumferentially between the adjacent leg portions 33 and the adjacent first terminals 31a, ensuring accessibility to the second terminals 24b. Thus, in the present preferred embodiment of the present invention, a process of connecting wire-ends to the second terminals 24b is facilitated.

In addition, in the present preferred embodiment of the present invention, since a second step section 33b (see FIG. 1) of the leg portions 33a is arranged axially above the guiding groove 22a of the insulator 22, it is possible to prevent the second conductor plate 24 from being removed in the axial direction.

As illustrated in FIGS. 2 and 5, the stator 20 preferably includes, for example, twelve divided cores 20a and twelve coils 23 provided on tooth portions 21b of each of the divided cores 20a. Since each of the coils 23 includes two wire ends, the winding-starting end and a winding-terminating end, twenty-four terminals are provided for connecting twelve wires to the bus bar 30 according to the preferred embodiment of the present invention. As illustrated in FIG. 5, the motor according to the present preferred embodiment of the present invention preferably is a three-phase motor (including U, V, and W phases) having a star configuration in which U, V and W phases are connected at a neutral point N.

As illustrated in FIG. 5, the winding-starting end of the wire defining each of coils 23 is connected to the neutral point N, thus twelve terminals, four terminals for each U, V, and W phases, are arranged on the motor. The connections to the neutral point N are achieved by connecting winding-starting ends to the second terminals 24b of the second conductor plate 24. Meanwhile, the winding-terminating ends of the wires defining coils 23 are connected the first terminals 31a arranged on the bus bar 30. By achieving connections to the neutral point N by the second conductor plate 22a arranged in the guiding groove 22a of the insulator 22, the number of connections to the bus bar is reduced, resulting in a reduction of a size of the bus bar 30 by reducing the terminals arranged on the bus bar 30.

By reducing number of connections to the bus bar 30, a width provided between adjacent first terminals 31a may be increased, ensuring accessibility to the first terminals 31a and facilitating wiring of the wire-terminating ends. Making the width between two adjacent first terminals 31a greater facilitates connection of a plurality of winding terminal ends (two winding-terminal ends in the present preferred embodiment of the present invention) from the same phase to one first terminal 31a. With this configuration, the number of first terminals 31a arranged on the bus bar 30 will be further reduced, making the width between adjacent first terminals 31a even greater.

Structure of Bus Bar

Figure 6:
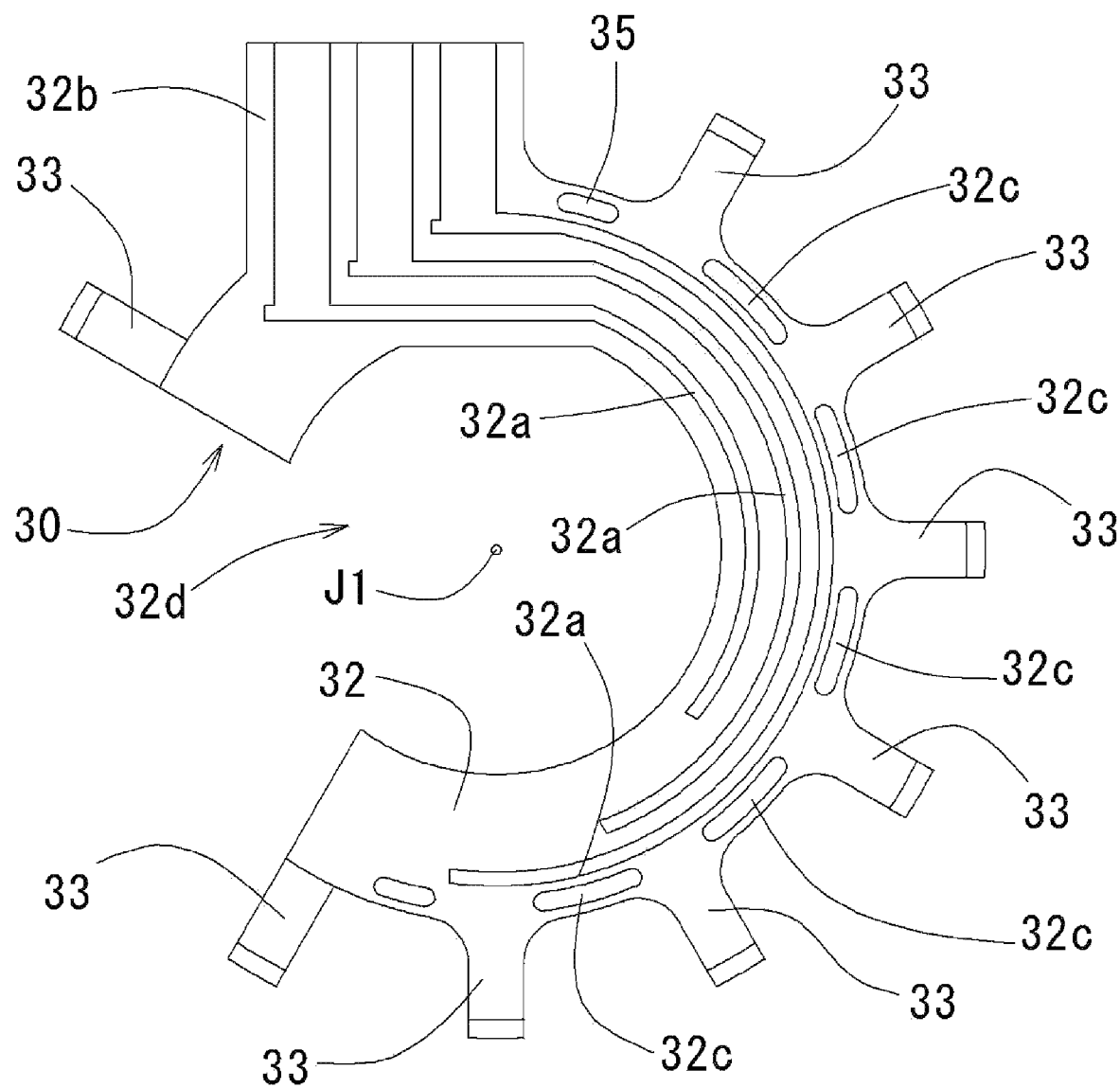
FIG. 6 is a plan view illustrating a bus bar prior to mounting conductor plates thereon.
Figure 7:
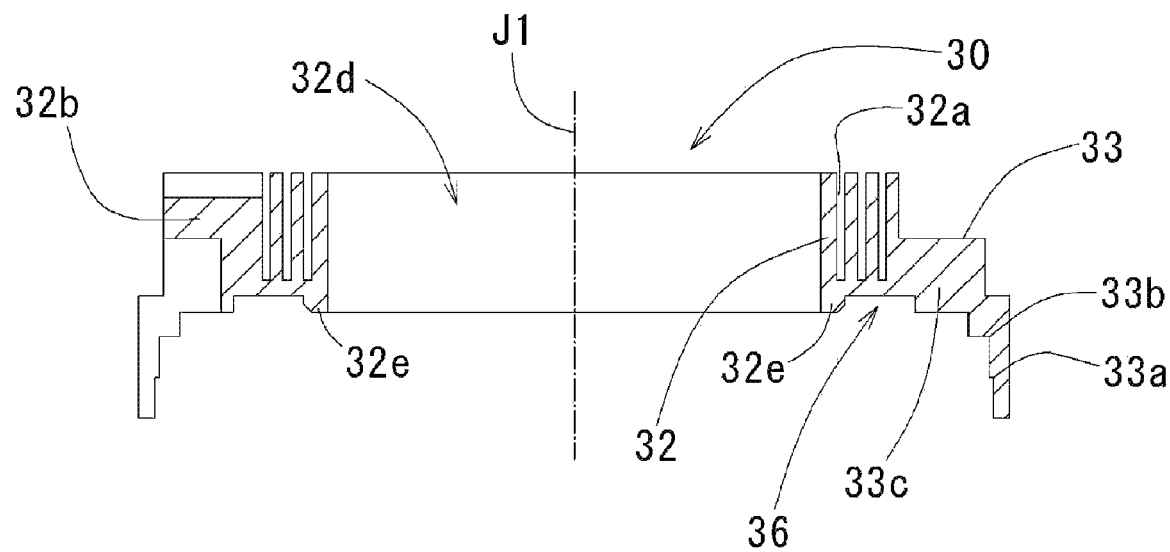
FIG. 7 is a view illustrating a cross section of the bus bar along the center axis.
Figure 8:
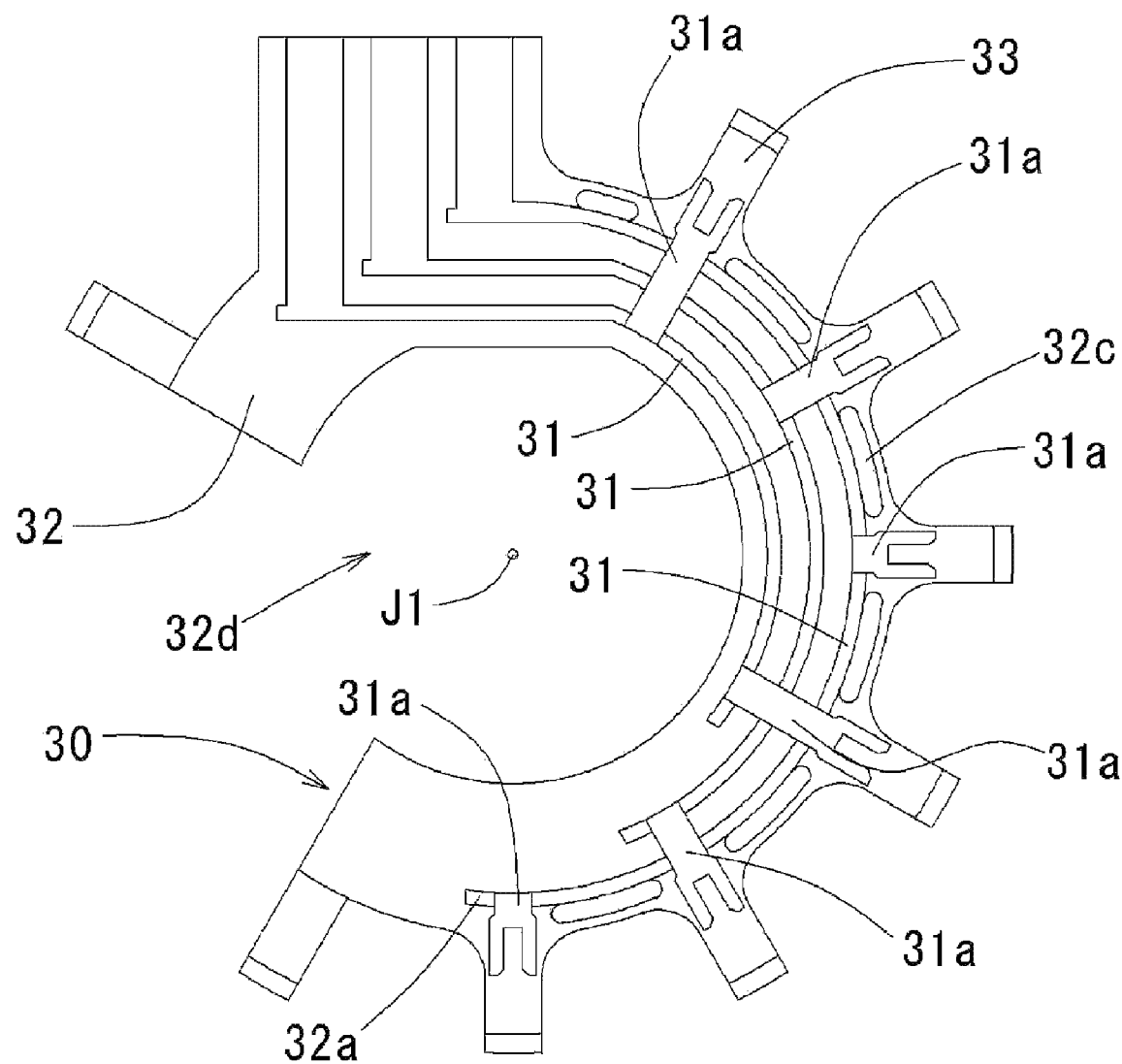
FIG. 8 is a plan view illustrating the bus bar with conductor plates mounted thereon.
Figure 9:
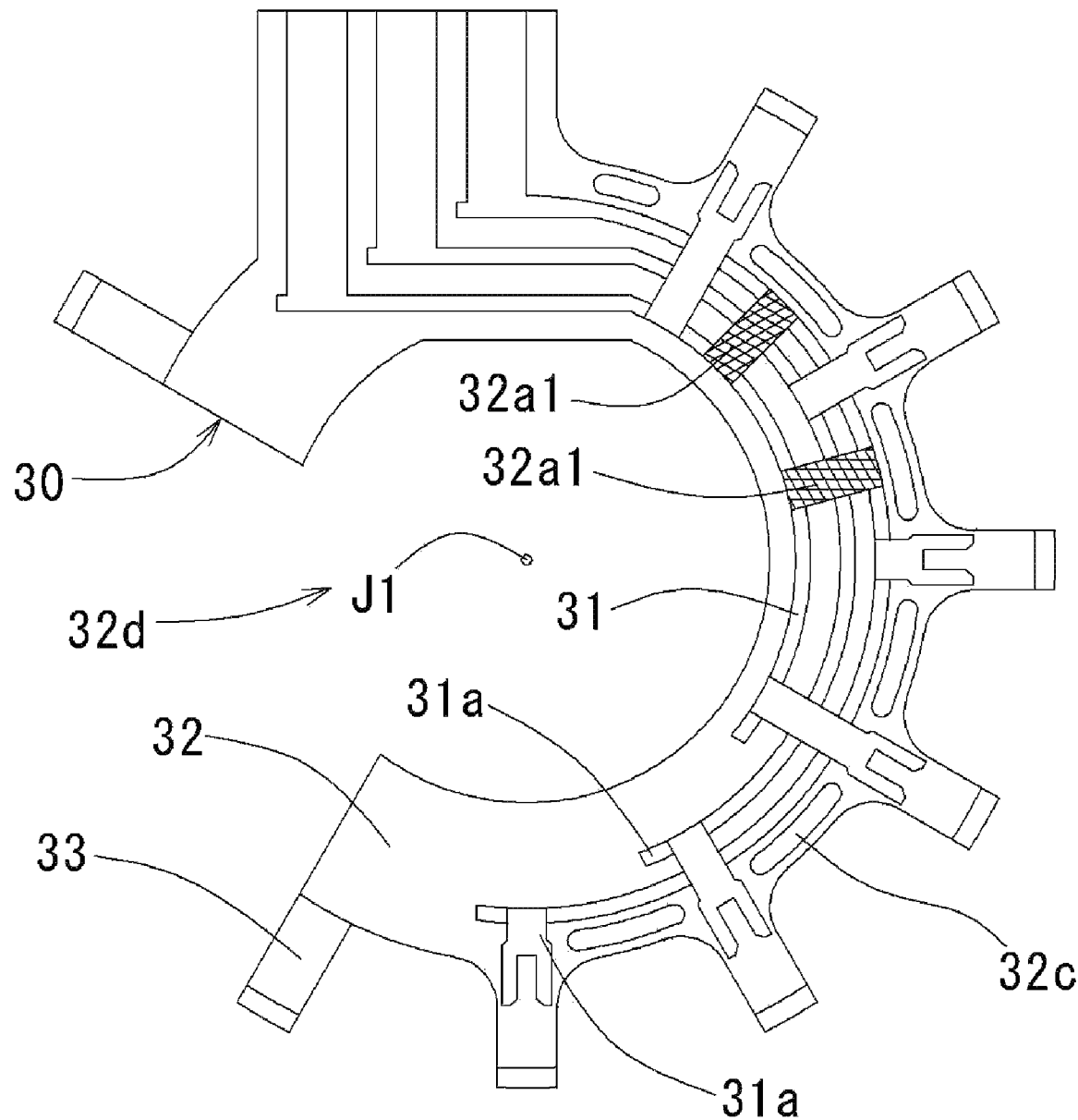
FIG. 9 is a plan view illustrating the bus bar in a state a part of the bus bar is melted to prevent the conductor plates from coming out of the bus bar.

With reference to FIGS. 6 to 9, a structure of the bus bar 30 will be described. FIG. 6 is a plan view illustrating the bus bar 30 prior to mounting the first conductor plate 31 on the bus bar 30. FIG. 7 is a view illustrating a cross section of the bus bar 30 along the center axis J1. FIG. 8 is a plan view illustrating the bus bar 30. FIG. 9 is a plan view illustrating the bus bar 30 after an adhesion process is performed thereto. A shaded portions illustrated in FIG. 9 indicate adhesion portions 32a1.

As illustrated in FIG. 6, the bus bar 30 includes a plate support 32 having an approximately arc shape centered on the center axis J1. The plate support 32 has an inner surface defining a portion of an insertion bore 32d centered on the center axis J1. The leg portions 33 that are integral with the plate support 32 extend radially outward from an outer surface of the plate support 32. The plate support 32 includes a plurality of insertion grooves 32a formed in an axially upper portion thereof and juxtaposed to each other in the radial direction. The first conductor plate 31 is arranged in and extends along the insertion groove 32a, and is electrically connected to an external connector 34 (see FIG. 1) at the connecting portion 32b. At radially outer portion on the plate support 32, a plurality of wire-positioning portions 32c (i.e., wire-positioning holes 32c) through which the wire is led are arranged. Each of the wire-positioning holes 32c preferably has an arc shape centered on the center axis J1, and is arranged circumferentially between adjacent leg portions 33. In the present preferred embodiment of the present invention, each of the wire-positioning holes 32c is preferably arranged axially above a position where the winding-start ends or the winding-terminating ends are led out from the coils 23. With this configuration, the wire is led to the wire-positioning holes 32c in a simple manner, facilitating the insertion of the winding-start end or the winding-terminating end into each of the wire-positioning holes 32c.

As illustrated in FIG. 7, each of the leg portions 33 includes a first step section 33a which contacts with the core back portion 21a of the stator 20, and the second step section 33b which is arranged axially upside of the first step section 33a. More particularly, the inner surface of the leg portion 33 radially inwardly extends and then axially upwardly extends to define the first step section 33a. In addition, at axially upside of the first step portion 33a, the radially inner surface further radially inwardly extends and then axially upwardly extends to define the second step section 33b. At an axially upper portion of the second step section 33b, a connecting portion 33c radially inwardly extends from the second step section 33b to the plate support 32. An axially lower surface of the connecting portion 33c includes a concave portion 36. A radially inner rim of the concave portion 36 is defined by a protruding portion 32e axially downwardly protrude from the plate support 32 at radially inner end of the plate support 32.

As illustrated in FIG. 8, the first conductor plate 32a, having the first terminals 31a radially outwardly extending therefrom, is arranged in the insertion groove 32a. The first terminals 31a extend to a location radially outside of the plate support 32 and are arranged axially above the leg portions 33. The axial depth of the insertion groove 32a is greater than the axial height of the first conductor plate 31.

As illustrated in FIG. 9, a portion of the plate support 32 crossing all insertion grooves 32a in the radial direction is melted from axially upper side thereof after the first conductor plates 31 are inserted in the insertion grooves 32a. Hereinafter, the portion of the plate support 32 to be melted is referred to as an adhesion portion 32a1. By melting the plate support 32 at the adhesion portion 32a1, a portion of the insertion groove 32a is partially closed, preventing the first conductor plate 31a from coming out of the insertion groove 32a.

Positional Relationship Between Bus Bar and Stator

Figure 10:
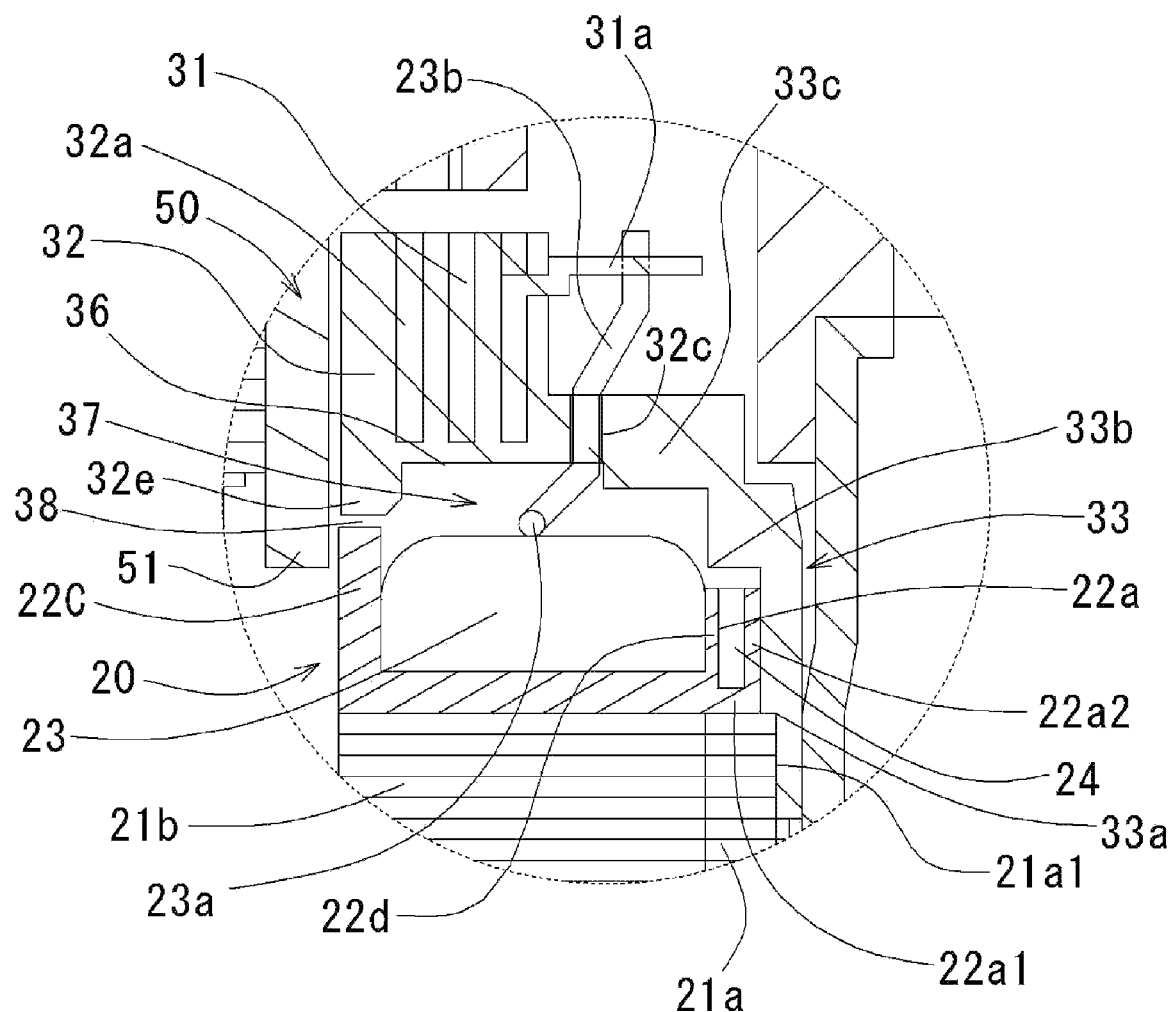
FIG. 10 is a view illustrating a positional relationship between one end of a wire defining a coil and a bus bar in a magnified manner.
Figure 11:
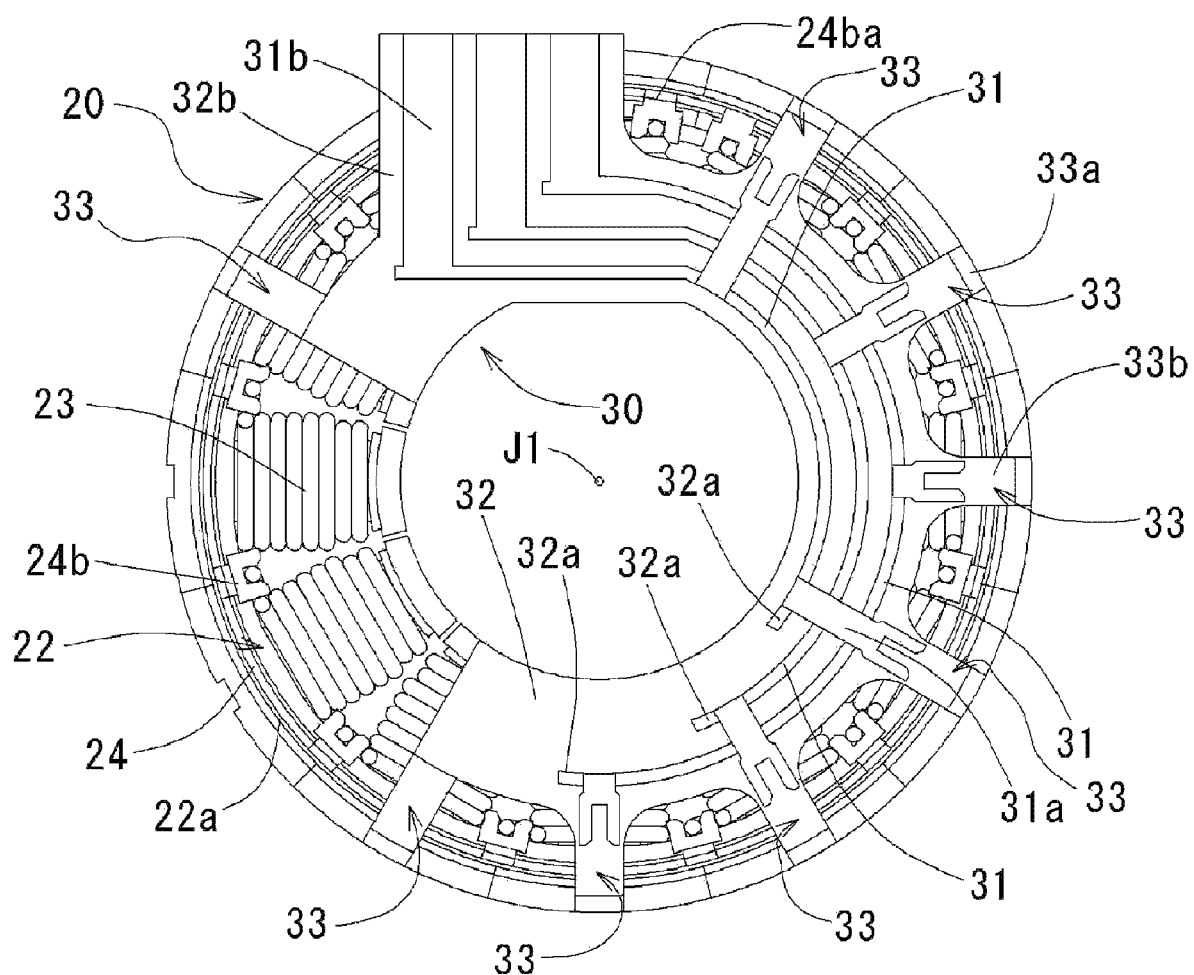
FIG. 11 is a plan view setting forth a positional relationship of the stator and the bus bar when they are assembled together.

With reference to FIGS. 1, 10, and 11, a configuration of the stator 20 and the bus bar 30 will be described in detail. FIG. 10 is a top view illustrating a positional relationship between the stator 20 and the bus bar 30.

As illustrated in FIG. 10, the bus bar 30 includes a plurality of leg portions 33 arranged in the circumferentially spaced manner. As previously described, each of the leg portions 33 includes the first step section 33a which is abutted against the upper surface of the stator core 20 at and/or around outer concave portion 22a1. At an axially upside of the first step section 33a, the second step section 33b is arranged. The second step section 33b extends radially inwardly so as to cover the axially upside of the guiding groove 22a. The connecting portion 33c radially inwardly extends from the upper section of the second step section 33b to the plate support 32. The plate support 32 supporting a plurality of first conductor plates 31 is arranged axially above the coils 23 of the stator 20.

As illustrated in FIG. 6, the plate support 32 is formed in an approximately arc shape centered on the center axis J1. The plate support 32 includes a plurality of insertion grooves 32a (for example, three grooves in the present preferred embodiment of the present invention) formed in an axially upper portion thereof and juxtaposed to each other in the radial direction. The first conductor plate 32a, having the first terminals 31a extending radially outwardly therefrom and connected with the winding-terminating ends from the coils 23, is arranged in the insertion groove 32a. The first terminals 31a extend to a location radially outside of the plate support 32 and are arranged axially above the leg portions 33. The first conductor plates 31 extend along the insertion grooves 32a, and are electrically connected to the external power supply (not illustrated in drawings) via the external connector 34 (see FIG. 1). The external connector 34 is welded with an end portion of the first conductor plate 31 at the connecting portion 32b.

As illustrated in FIG. 11, the insulators 22 attached to the stator core 21 include the inner walls 22c and the outer walls 22d to prevent the wire wound around the tooth portion 21b via the insulators 22 from falling radially inwardly and/or radially outwardly of the tooth portion 21b. At least one of the insulators 22 (preferably the axially upper insulator 22) also includes the guiding groove 22a which is defined by the radially outer surface of the outer wall 22d, the outer extension 22a1 radially outwardly extending from the radially outer surface of the outer wall 22d, and the groove wall 22a2 axially upwardly extending from the radially outside end of the outer extension 22a1. In the guiding groove 22a, the second conductor plate 24 is arranged. The second conductor plate 24 includes a plurality of second terminals 24b arranged in the circumferentially spaced manner. The second conductor plate 24 is used for connecting the winding-starting ends of coils 23 to the neutral point N.

The bus bar 30 is supported on the stator core 21 by the first step section 33a of the leg portion 33 contacting to the core back 21a of the stator core 21. More particularly, the first step section 33a is abutted against the core back 21a at the outside concave portion 21a1, defined by a radially outside surface of the core back 21a and a radially inner surface of the cylindrical portion 12 of the housing 10. A portion of the leg portion 33 arranged axially lower than the first step section 33a is inserted into the outside concave 21a1, and the first step section 33a is abutted against the radially outer portion of the core back 21.

The second step section 33b of the leg portion 33 is arranged axially above the guiding groove 22a, preventing the second conductor plate 24 arranged in the guiding groove 22a from coming out of the guiding groove 22a in the axial direction.

A wire-receiving portion 37 is defined between the concave portion 36 arranged at the axially lower surface of the plate support 32 and an axially upper surface of the coil 23, and a crossover wire portion 23a, a portion of the wire extracted from the coil 23, is housed inside the wire-receiving portion 37. The crossover wire portion 23a extends in the circumferential direction axially above the coils 23. Thus, a wire is led along the circumferential direction above the coil (s) 23 and then led axially upward toward the first terminal 31a. A portion of the wire between the crossover wire portion 23a and the first terminal 31a, extending in the axial direction, is referred to as a terminal connecting portion 23b. The wire-receiving portion 37 is connected to the radially inside space via a narrow gap 38, preferably having an axial height smaller than the diameter of the wire. With this configuration, it is possible to prevent the wires from falling into a radially inside direction, preventing the crossover wire portion 23a from contacting rotating components arranged radially inside of the inner wall 22c and the plate support 32 (e.g., the cover member 100, the yoke 80, the rotor magnet 90, and the shaft 70). Thus, it is possible to prevent the wires being damaged by contacting the rotating components, thereby making it possible to provide a reliable motor.

The inner cylindrical portion 51 of the bearing holder 50 is inserted into the insertion bore 32 of the bus bar 30. The inner cylindrical portion 51 extends axially downwardly such that the lower end thereof is arranged axially lower than the upper end portion of the inner wall 22c of the insulator 22. In other words, a portion of the inner cylindrical portion 51 is arranged radially inside of the narrow gap 38 defined between the protruding portion 32e of the bus bar 30 and the inner wall 22c of the insulator 22. In addition, the inner cylindrical portion 51 radially faces the inner surface of the plate support 32 defining the insertion bore 32d and the inner wall 22c of the insulator 22 via a radial gap. The width of the radial gap in the radial direction is preferably smaller than the diameter of the wire. With this configuration, it is possible to prevent the wires from falling into a radially inside direction, preventing the crossover wire portion 23a from contacting rotating components (e.g., the cover member 100, the yoke 80, the rotor magnet 90, and the shaft 70). In addition, through the configuration in which the inner cylindrical portion 51 is arranged in a manner radially overlapping with other components, the resolver attached to the inner surface of the inner cylindrical portion 51 is arranged at axially lower position as well, enabling a reduction in the axial height of the motor. According to the present preferred embodiment of the present invention, the motor having a reduced axial height and high reliability is provided. Such motor is preferably used for an electrically powered power-steering system, in which downsizing of the brushless motor used therein is in demand.

Positional Relationship between Bus Bar and Resolver

Figure 12:
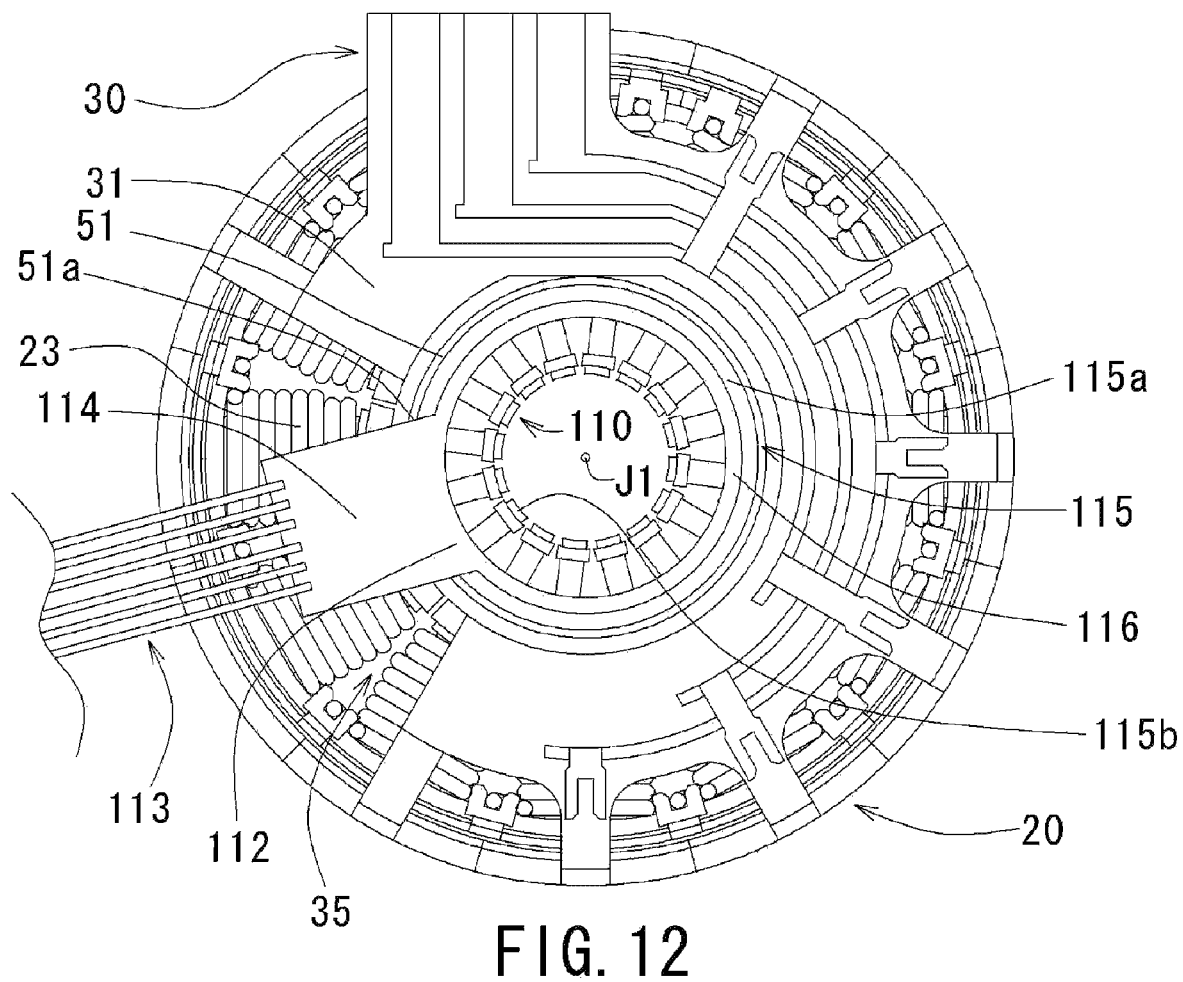
FIG. 12 is a plan view setting forth a positional relationship of the resolver and the bus bar when they are assembled together.
Figure 13:
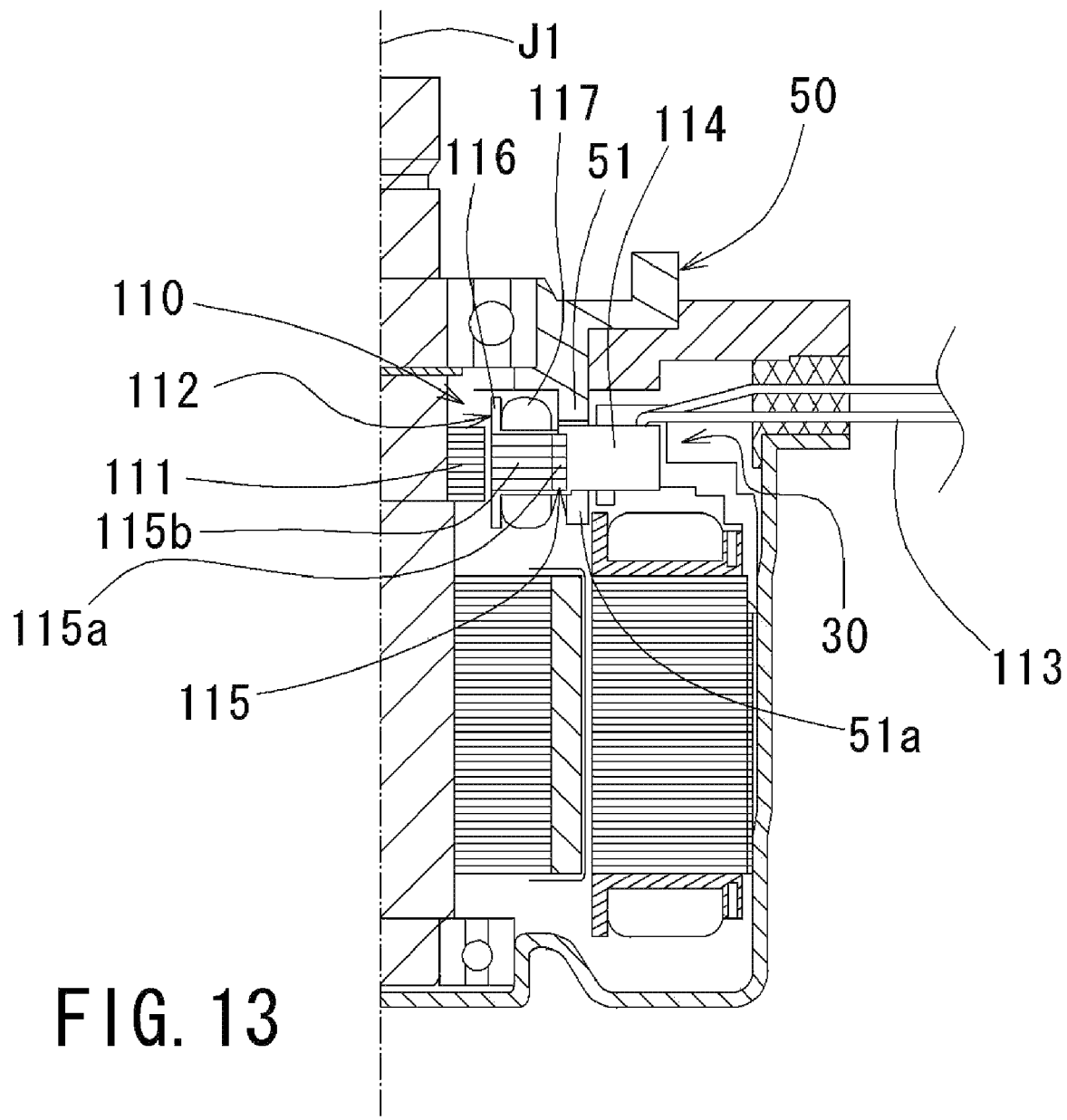
FIG. 13 is a cross sectional view setting forth a positional relationship of the resolver and the bus bar when they are assembled together.

With reference to FIGS. 1, 12, and 13, a positional relationship between the bus bar 30 and the resolver 110 will be described. FIG. 12 is a top view setting forth a positional relationship of the resolver 110 and the bus bar 30 when they are assembled together. In FIG. 12, however, a resolver rotor 111 and resolver coils 117 of a resolver stator 112 are not illustrated. FIG. 13 is a cross sectional view setting forth a positional relationship of the resolver 110 and the bus bar 30 when they are assembled together.

As illustrated in FIG. 1, the resolver 110 is arranged radially inward of the plate support 21 of the bus bar 30. With this configuration, it is possible to reduce the axial height of the motor.

As illustrated in FIG. 12, the resolver 110 includes the resolver stator 112 and the resolver rotor 111, and the resolver stator 112 includes a connecting portion 114 to which a lead wire 113 is connected. The resolver stator 112 is connected to an external controller (not illustrated in drawings) via the lead wire 113 to send a signal to the external controller. The lead wire 113 is connected to the connecting portion 114 from an axially upper side of the connecting portion 114. With this configuration, it is possible to prevent the lead wire 113 from contacting with the coils 23 of the stator 20.

As illustrated in FIG. 13, the inner cylindrical portion 51 of the bearing holder 50 includes a notch 51a through which the connecting portion 114 extends in the radially outside of the inner cylindrical portion 51.

As illustrated in FIGS. 12 and 13, the resolver stator 112 of the resolver 110 includes a resolver stator core 115 having a circular resolver core back 115a and a plurality of resolver teeth 115b radially inwardly extending from the resolver core back 115a, resolver insulators 116, and a plurality of resolver coils 117 defined by wires wound around the resolver teeth 115b via the resolver insulators 116. The resolver stator core 115 is preferably formed by laminating a plurality of magnetic plates. The resolver rotor 111 is also preferably formed by laminating a plurality of magnetic plates.

As illustrated in FIG. 12, the bus bar 30 preferably has an arc shape, and the connecting portion 114 of the resolver 110 and the lead wire 113 are arranged in an open space 35 of the arc shape, such that the bus bar 30, the connecting portion 114, and the lead wire 113 are not arranged in an axially overlapping manner. With this configuration, it is possible to prevent the connecting portion 114 and the bus bar 30 from contacting each other even when the resolver 110 and the bus bar 30 are arranged in a radially overlapping manner.

In the present preferred embodiment of the present invention, the resolver 110 and the bus bar 30 are preferably arranged in a radially overlapping manner to reduce the axial height of the motor. In this case, since the resolver 110 includes the connecting portion 114 extending radially outwardly from radially inside to outside of the bus bar 30, the first terminals 31a may not be arranged along the entire circumference of the circular shape centered on the center axis J1 while reducing the axial height of the motor. In the present preferred embodiment of the present invention, the bus bar 30 preferably has the arc shape defining the open space 35, and thus the connecting portion 114 may radially extend without axially overlapping the bus bar 30. The coils 23 of the stator 20 are circumferentially arranged, and thus, the wires from the coils arranged axially below the open space 35 are circumferentially led to the first terminals 31a. In the present preferred embodiment of the present invention, the portion of the wire led in the circumferential direction, the crossover wire portion 23a, is housed in the wire-receiving portion 37, the connection between the wires from the coils arranged axially below the open space 35 and the first terminal pins 31a may be easily established.

While preferred embodiments of the present invention have been described above, it is to be understood that variations and modifications will be apparent to those skilled in the art without departing the scope and spirit of the present invention.

In the preferred embodiments of the present invention, the bus bar 30 is preferably formed by inserting the first conductor plate 31 into the insertion groove 32a of the plate support 32. Alternatively, the bus bar 30 having the first conductor plate 31 and the plate support 32 may be formed by injection molding.

In the preferred embodiment of the present invention, the stator 20 preferably includes a plurality of divided cores 21 connected to each other so as to define a circular or substantially circular shape. Alternatively, the stator 20 may be constituted with a single stator core having a circular or substantially circular shape. Alternatively, the stator 20 may be formed by curving the stator core, having a straight shape and a plurality of coils, at the predetermined positions to provide the stator core with the circular or substantially circular shape.

In preferred embodiments of the present invention, the second conductor plate 24 preferably has a circular or substantially circular shape. Alternatively, the second conductor plate 24 may have any suitable shape as long as the connections between the wire ends and the second terminals 24b can be established. For example, the second conductor plate 24 may have an arc shape or a polygon shape (e.g., dodecagon).

In the preferred embodiments of the present invention, for example, twelve divided cores 20a are connected to form the stator 20. However, the number of divided cores to be used for forming the stator 20 is not limited to twelve. Alternatively, the stator 20 may include one stator core having the circular or substantially circular shape. In the present preferred embodiment of the present invention, the wire is preferably wound around each of the tooth portions 21b of each of the divided cores 21a. It should be noted, however, other wire-winding methods (e.g., a distributed winding method) may be preferably applied.

In the preferred embodiments of the present invention, the second terminals 24b are preferably arranged radially inward of the body portion 24a of the second conductor plate 24 by providing the bent portions 24b1 radially inside of the body portion 24a. It should be noted that the second terminals 24b may be arranged radially outside of the body portion 24a of the second conductor plate 24 by providing the bent portions 24b1 radially outside of the body portion 24a as long as the second terminals 24b do not interfere with other components. Meanwhile, it is not necessary to provide the bent portions 24b1 to the second terminals 24b.

The motor according to the preferred embodiments of the present invention preferably has a star configuration. Alternatively, the motor may have a delta configuration. In this case, three second conductor plates are preferably arranged on the motor, and it is preferable that each of the second conductor plates has an arc shape.

In the preferred embodiments of the present invention, the stator 20 preferably includes a plurality of divided cores 21 arranged and connected to define a circular or substantially circular shape. Alternatively, the stator 20 may be formed by curving the stator core, having a straight shape and a plurality of coils, at the predetermined positions to provide the stator core with the circular or substantially circular shape.

Figure 14:
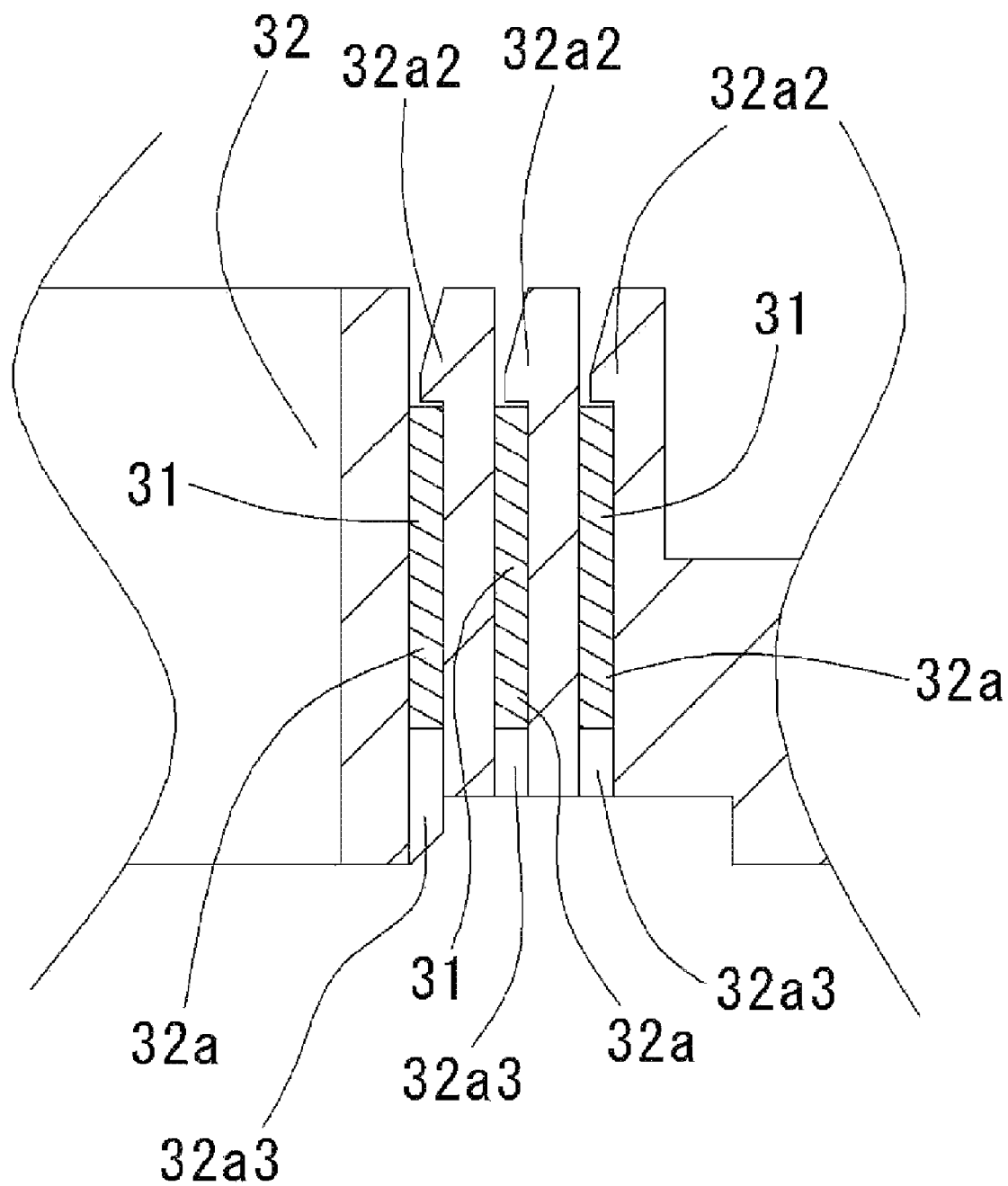
FIG. 14 is a view illustrating a portion of the bus bar according to a modified preferred embodiment of the present invention in a magnified manner.

In the present preferred embodiments of the present invention, a portion of the plate support 32 crossing all insertion grooves 32a in the radial direction is preferably melted from an axially upper side thereof after the first conductor plates 31 are inserted in the insertion grooves 32a to prevent the first conductor plates 31 from coming out of the insertion grooves 32a. Alternatively, as illustrated in FIG. 14, the insertion groove 32a includes a portion where the width thereof in the radial direction is narrower than a thickness of the body portion 24a in the radial direction. The portion will be simply referred to as a pawl 32a2. In the preferred embodiment, a plurality of the pawls 32a2 are provided to the bus bar 30. The pawls 32a2 may be at arranged axially upper portion of the insertion groove 32a. Each of the pawls 32a2 includes an inclining surface radially inwardly inclining along the axially lower direction. The inclining surfaces of the pawls 32a2 guide the first conductor plates 31 into the insertion grooves 32a when inserting the first conductor plates 31 into the insertion grooves 32a. Then axially lower portions of the pawls 32a2 are latched to the first conductor plates 31, preventing the first conductor plates 31 from coming out of the insertion grooves 32a in the axial direction. Preferably, the pawls 32a2 are arranged in a circumferentially spaced manner in each of the insertion grooves 32a. In addition, openings 32a3 are provided at portions axially below the pawls 32a2 in each of the insertion grooves 32a2. With this configuration, it becomes possible to move an upper and lower dies used for molding the plate support 32 in the axial direction, facilitating the manufacture of the plate support 32 having the pawls 32a2 integrally formed therewith. It should be noted that the openings 32a3 may not extend in the entire circumference of the insertion groove 32a. It is preferable that the openings 32a3 are solely provided at positions axially below the pawls 32a2. It is also preferable that the opening 32a3 is not large enough that the first conductor plate 31 comes out of the insertion groove 32a.

In the present preferred embodiment of the present invention, the wire-positioning hole 32c preferably has an arc shape. It should be noted, however, the shape of the wire-positioning hole 32c may be any other suitable shape as long as the end portion of the wire is properly positioned. For example, the end portion of the wire may be positioned with a groove formed on an outer surface of the leg portion 33.

What is claimed is:

1. A motor comprising:
a stator including:
a stator core including a core back having a substantially circular shape centered on a center axis, and a plurality of tooth portions extending radially inwardly from the core back and arranged in a circumferentially spaced manner;
an insulator covering at least a portion of the stator core so as to insulate at least the portion of the stator core; and
a coil defined by a multilayer structure of a wire wound around each of the tooth portions via the insulator; and
a bus bar arranged axially above the stator and including:
a conductor plate having a plurality of terminals arranged to be connected to an end portion of the wire, and
a plate support supporting the conductor plate and having an axially lower surface, a portion of the plate support faces the coil via a space defined therebetween; wherein
the wire includes a crossover wire portion and the wire extracted from the coil extends in the circumferential direction at the crossover wire portion;
an axial height of the space defined between the portion of the lower surface of the plate support and the coil is greater than a diameter of the wire; and
a portion of the insulator, which is located radially inside relative to the coil, axially faces the axially lower surface of the plate support via a gap defined therebetween, and an axial height of the gap is smaller than a diameter of the wire.

2. The motor as set forth in claim 1, wherein the lower surface of the plate support includes a concave portion where the lower surface is indented in an axially upper direction, and the crossover wire portion of the wire substantially extends in or axially below the concave portion.

3. The motor as set forth in claim 1, wherein the lower surface includes a protruding portion and the lower surface of the plate support protrudes axially downwardly at the protruding portion the protruding portion is arranged radially inside of the coil and an axially lower end of the protruding portion axially faces the insulator via a gap defined therebetween, and an axial height of the gap is smaller than a diameter of the wire.

4. The motor as set forth in claim 3, wherein the insulator includes an inner wall extending in the axial direction and arranged radially inside of the coil, and an upper end of the inner wall axially faces the axially lower end of the protruding portion via the gap.

5. The motor as set forth in claim 4, further comprising:
a housing having a substantially cylindrical portion surrounding an outer surface of the stator;
a bracket including a discoid portion covering an axially upper side of the substantially cylindrical portion of the housing and an inner cylindrical portion extending axially downwardly from the discoid portion, the inner cylindrical portion has a diameter smaller than that of a radially inner end of the coil; wherein
a portion of the inner cylindrical portion is arranged in a radially overlapping manner with a portion of the insulator, the plate support includes an insertion hole in which the inner cylindrical portion is inserted, and the inner cylindrical portion inserted in the insertion hole and the plate support radially faces with a radial gap defined therebetween, having a radial width smaller than the diameter of the wires.

6. A motor comprising:
a stator including:
a stator core including a core back having a substantially circular shape centered on a center axis, and a plurality of tooth portions radially extending inwardly from the core back and arranged in a circumferentially spaced manner;
an insulator covering at least a portion of the stator core so as to insulate at least the portion of the stator core; and
a coil defined by a multilayer structure of a wire wound around each of the tooth portions via the insulator; and
a bus bar arranged axially above the stator and including:
a conductor plate having a plurality of terminals arranged to be connected to end portions of the wire; and
a plate support supporting the conductor plate and having an axially lower surface, a portion of the plate support faces the coil via a space defined therebetween;
a housing having a substantially cylindrical portion surrounding an outer surface of the stator;
a bracket including a discoid portion covering an axially upper side of the substantially cylindrical portion of the housing and an inner cylindrical portion extending axially downwardly from the discoid portion, the inner cylindrical portion has a diameter smaller than that of a radially inner end of the coil; and
a portion of the inner cylindrical portion is arranged in a radially overlapping manner with a portion of the insulator, the plate support includes an insertion hole in which the inner cylindrical portion is inserted, and the inner cylindrical portion inserted in the insertion hole and the plate support radially faces with a radial gap defined therebetween, having a radial width smaller than the diameter of the wire.

7. A motor comprising:
a stator including:
a stator core including a core back having a substantially circular shape centered on a center axis, and a plurality of tooth portions extending radially inwardly from the core back and arranged in a circumferentially spaced manner;
an insulator covering at least a portion of the stator core so as to insulate at least the portion of the stator core; and
a coil defined by a multilayer structure of a wire wound around each of the tooth portions via the insulator; and
a bus bar arranged axially above the stator and including:
a conductor plate having a plurality of terminals arranged to be connected to an end portion of the wire;
a plate support supporting the conductor plate and having an axially lower surface, a portion of which faces the coil via a space defined therebetween;
a plurality of leg portions arranged in a circumferentially spaced manner and positioning the plate support axially above the stator; and
a wire positioning portion arranged at a radially outside portion of the plate support; wherein
one end of the wire is inserted into the wire positioning portion to set a position where the wire is led axially upward of the plate support.

8. The motor as set forth in claim 7, wherein the wire-positioning portion is a through hole having an arc shape centered on the center axis and arranged circumferentially between adjacent leg portions.

9. The motor as set forth in claim 7, wherein the wire-positioning portion is a groove arranged in a radially outside surface of at least one of the leg portions.

10. The motor as set forth in claim 7, wherein the terminals of the conductor plate are arranged in a manner axially overlapping with the leg portions.

11. The motor as set forth in claim 7, wherein the wire includes a crossover wire portion and the wire is extracted from the coil to extend in the circumferential direction about the crossover wire portion, the crossover wire portion is arranged radially inside from the wire-positioning portion.

12. A motor comprising:
a stator including:
a stator core including a core back having a substantially circular shape centered on a center axis, and a plurality of tooth portions extending radially inwardly from the core back and arranged in a circumferentially spaced manner;
an insulator covering at least a portion of the stator core so as to insulate at least the portion of the stator core; and
a coil defined by a multilayer structure of a wire wound around each of the tooth portions via the insulator; and
a bus bar arranged axially above the stator, and including:
a conductor plate having a plurality of terminals arranged to be connected to an end portion of the wire, and a body portion connecting a plurality of the terminals; and
a plate support having in an axially upper surface an insertion groove which supports the conductor plate therein and a axially lower surface, a portion of which faces the coil via a space defined therebetween; wherein
an axial depth of the insertion groove is greater than an axial height of the body portion of the conductor plate, and the insertion groove has a portion where a width thereof in the radial direction is narrower than a thickness of the body portion in the radial direction.

13. The motor as set forth in claim 12, wherein the portion of the insertion groove, where the width thereof in the radial direction is narrower than a thickness of the body portion in the radial direction, is defined by an inclining surface radially inclining such that the width of the insertion groove is gradually reduced along the axially lower direction.

14. The motor as set forth in claim 13, wherein the insertion groove includes a plurality of portions where the width thereof in the radial direction is narrower than a thickness of the body portion in the radial direction, and the portions are arranged in a circumferentially spaced manner in the insertion groove.

15. The motor as set forth in claim 13, wherein the plate support includes a through hole arranged to connect the insertion groove and axially lower side of the plate support, the through hole is arranged axially below the portion where the width of the insertion groove in the radial direction is narrower than a thickness of the body portion in the radial direction.

16. The motor as set forth in claim 12, wherein a plurality of insertion grooves are arranged in the plate support, the insertion grooves are juxtaposed to each other in the radial direction.

17. The motor as set forth in claim 1, wherein the stator includes a plurality of divided cores each of which has a single tooth portion and a single coil defined by the multilayer structure of the wire wound around the tooth portion via the insulator, and the stator is defined by the plurality of divided cores being connected to each other in a substantially circular configuration.

18. The motor as set forth in claim 1, further comprising a resolver arranged radially inside of the bus bar and a connecting portion radially extending from the resolver, wherein the connecting portion extends radially outside of the plate support of the bus bar.

* * * * *